(12) United States Patent
Koehler et al.

(10) Patent No.: US 12,208,809 B2
(45) Date of Patent: Jan. 28, 2025

(54) SYSTEMS AND METHODS FOR AUTOMATICALLY GENERATING SOLVER CODE FOR NONLINEAR MODEL PREDICTIVE CONTROL SOLVERS

(71) Applicant: Toyota Research Institute, Inc., Los Altos, CA (US)

(72) Inventors: Sarah Koehler, Sunnyvale, CA (US); Soonho Kong, Arlington, MA (US); Frank N. Permenter, Cambridge, MA (US); Kevin Zaseck, New Hudson, MI (US); Avinash Balachandran, Sunnyvale, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 878 days.

(21) Appl. No.: 16/931,557

(22) Filed: Jul. 17, 2020

(65) Prior Publication Data

US 2022/0017103 A1  Jan. 20, 2022

(51) Int. Cl.
*B60W 40/10* (2012.01)
*G05B 13/04* (2006.01)
*G06F 17/16* (2006.01)

(52) U.S. Cl.
CPC ........... *B60W 40/10* (2013.01); *G05B 13/042* (2013.01); *G05B 13/047* (2013.01);
(Continued)

(58) Field of Classification Search
None
See application file for complete search history.

(56) References Cited

U.S. PATENT DOCUMENTS 9,377,998 B2   6/2016  Han et al.
9,619,212 B2   4/2017  Fige et al.
(Continued)

FOREIGN PATENT DOCUMENTS

CN   111258323 A  *  3/2020  ............ G05B 13/04

OTHER PUBLICATIONS

Control Parameter Optimization for Autonomous Vehicle Software Using Virtual Prototyping, Dai et al., 2017 IEEE 28th International Symposium on Software Reliability Engineering Workshops.*
(Continued)

*Primary Examiner* — David J Stoltenberg
(74) *Attorney, Agent, or Firm* — DINSMORE & SHOHL LLP

(57) ABSTRACT

Systems and methods for automatically generating solver code for a nonlinear model predictive controller are disclosed. In one embodiment, a method of automatically generating solver code for a nonlinear model predictive control solver includes receiving an optimal control problem code, wherein the optimal control problem code represents an optimal control problem comprising a cost function, one or more constraints, and a continuous time model representing dynamics of a system. The method further includes receiving a discretization method preference, a linearization point preference, and a parameter specification, and encoding the optimal control problem into an optimization problem by discretizing the optimal control problem according to the discretization method preference, and linearizing the optimal control problem according to the linearization point preference. The method further includes generating the solver code from the optimization problem.

20 Claims, 7 Drawing Sheets

(52) U.S. Cl.
CPC ........... *G05B 13/048* (2013.01); *G06F 17/16* (2013.01); *B60W 2520/10* (2013.01); *B60W 2554/4046* (2020.02); *B60W 2554/4049* (2020.02)

(56) References Cited

U.S. PATENT DOCUMENTS

| | | | | |
|---|---|---|---|---|
| 10,191,787 | B1* | 1/2019 | Kher | G06F 9/541 |
| 10,915,075 | B2* | 2/2021 | Jiang | G05B 13/048 |
| 11,080,103 | B1* | 8/2021 | Kher | G06F 30/20 |
| 11,354,463 | B1* | 6/2022 | Babaali | G06F 8/35 |
| 2009/0012756 | A1* | 1/2009 | Glass | G06F 30/20 |
| | | | | 703/2 |
| 2018/0046192 | A1* | 2/2018 | Keller | G05D 1/0212 |
| 2018/0081681 | A1* | 3/2018 | Sethu | G06F 11/3636 |
| 2018/0137083 | A1* | 5/2018 | Aramon | G06F 17/16 |
| 2019/0026404 | A1* | 1/2019 | Gumussoy | G06F 30/20 |
| 2019/0375441 | A1* | 12/2019 | Green | B61L 3/006 |
| 2019/0377351 | A1* | 12/2019 | Phillips | B62D 15/025 |
| 2020/0132775 | A1* | 4/2020 | Kanai | G01R 31/367 |
| 2020/0293009 | A1* | 9/2020 | Quirynen | B60W 50/0097 |
| 2020/0377087 | A1* | 12/2020 | Chen | B60W 40/072 |
| 2021/0165409 | A1* | 6/2021 | Berntorp | G05D 1/0214 |
| 2021/0373513 | A1* | 12/2021 | Quirynen | G06F 17/13 |
| 2021/0403056 | A1* | 12/2021 | McGill | B60W 50/0097 |
| 2024/0075981 | A1* | 3/2024 | Wyciechowski | B60W 50/029 |

OTHER PUBLICATIONS

Pytlak et al., Solvers chaining in the IDOS server for dynamic optimization, 52nd IEEE Conference on Decision and Control Dec. 10-13, 2013. Florence, Italy.*
Auto-generated Algorithms for Nonlinear Model Predictive Control on Long and on Short Horizons, Vukov et al.

* cited by examiner

```
                ⎧ // Create a linearized / discretized system.
                ⎪ auto system = Builder()
                ⎪ // Indicate the state variables of the dynamic system are called v, a.
                ⎪ .state({v, a})
                ⎪ // Indicate the control input to the dynamic system is J.
                ⎪ .input(J)
                ⎪ // Indicate parameters of the dynamic system are beta_1, beta_2.
          202 ⎨ .parameter({beta_1, beta_2})
                ⎪ // Encode the differential equations describing the dynamics
                ⎪ // $\dot{v}$ and $\dot{a}$, equations (1a), (1b).
                ⎪ .dynamics({a_cmd - beta_1 - beta_2 * pow(v, 2), J})
                ⎪ // Linearize the dynamics with the linearization point of v set to v_LP.
                ⎪ .LinearizeDynamics(v, v_LP)
                ⎪ // Discretize the dynamics using forward euler method with the specified time_step.
                ⎪ .DiscretizeDynamicsForwardEuler(time_step)
                ⎩ .Build<Expression>();

⎧ // Add stage costs, equations (2).
                ⎪ // Create a time varying parameter called ref_velocity.
                ⎪ ref_v_ = prog.NewSequentialParameter("ref_velocity");
                ⎪ // Create a time varying parameter called ref_acceleration.
                ⎪ ref_a_ = prog.NewSequentialParameter("ref_acceleration");
          204 ⎨ // Add to the cost function $\sum_{k=0}^{N} [\psi_v (v(k) - v_{des})^2$.
                ⎪ prog.AddRunningCost(problem_parameters.cost.velocity * pow(v - ref_v_, 2));
                ⎪ // Add to the cost function $\sum_{k=0}^{N} [\psi_a (v(k) - a_{des})^2$.
                ⎪ prog.AddRunningCost(problem_parameters.cost.accel * pow(vdot_linearized - ref_a_, 2));
                ⎪ // Add to the cost function $\sum_{k=0}^{N} [\psi_j J(k)^2$.
                ⎩ prog.AddRunningCost(problem_parameters.cost.jerk * pow(J, 2));
```

```
/* Auto generated solver customizations*/
struct Config {
    using NumericType = double;
    enum : bool {
    kDiagonalMatrices = true,
    kTimeInvariant = true,
    kDynamicMemoryAllocation = false,
    }
    enum : int {
      kNumStates = 3,
      kNumInputs = 5,
    }
}
```

224

```
/* Auto generated solver inputs */
Matrix A(Parameters p) {

}
Matrix B(Parameters p) {

}

DoSolve(Parameters p) {
    y = Conex::Solve<Config>( A(p), B(p), ... );
}
```

```
Matrix MakeInput(Parameters p) {
    A[0][0] = (0.02 + (2 * (1 + (-4 * (1 * p[1] * p[2] * p[3])) +
            (4 * (1 * pow(p[1], 2.000000) * pow(p[2], 2.000000) *
            pow(p[3], 2.000000))))));
    A[0][1] = (0 + (2 * p[3]) + (-4 * (1 * p[1] * p[2] * pow(p[3], 2.000000))));
    A[1][0] = (0 + (2 * p[3]) + (-4 * (1 * p[1] * p[2] * pow(p[3], 2.000000))));
    A[1][1] = (2 * pow(p[3], 2.000000));
    return A;
}
```

FIG. 6

SYSTEMS AND METHODS FOR AUTOMATICALLY GENERATING SOLVER CODE FOR NONLINEAR MODEL PREDICTIVE CONTROL SOLVERS

TECHNICAL FIELD

The present specification relates to nonlinear model predictive control solvers and, more particularly, methods and systems for generating solver code for nonlinear model predictive control solvers.

BACKGROUND

Nonlinear model predictive controllers may be utilized to control a nonlinear system, such as an autonomous vehicle according to a desired reference. Nonlinear model predictive controllers predict future outcomes over a receding horizon, and attempt to minimize a cost between a predicted outcome and an actual outcome by use of a cost function.

Nonlinear model predictive controllers receive as input executable solver code that represents an optimization problem that is derived from a higher-level optimal control problem for controlling the controlled system within defined constraints. However, solver code is typically very lengthy and very complicated. It can take software developers many hours or days to write solver code that is executable by the nonlinear model predictive controller. Further, writing such solver code is prone to inclusion of errors, which can lead to lengthy debugging delays. Also, making minor changes to the solver code (e.g., adding a constraint) requires the additional and/or modification of many lines of solver code. The cumbersome solver code significantly delays development time for controlled systems, such as autonomous vehicles.

Accordingly, alternative methods for generating solver code for nonlinear model predictive controllers are desired.

SUMMARY

In one embodiment, a method of automatically generating solver code for a nonlinear model predictive control solver includes receiving an optimal control problem code, wherein the optimal control problem code represents an optimal control problem comprising a cost function, one or more constraints, and a continuous time model representing dynamics of a system. The method further includes receiving a discretization method preference, a linearization point preference, and a parameter specification, and encoding the optimal control problem into an optimization problem by discretizing the optimal control problem according to the discretization method preference, and linearizing the optimal control problem according to the linearization point preference. The method further includes generating the solver code from the optimization problem.

In another embodiment, a method of controlling a vehicle includes receiving an optimal control problem code, wherein the optimal control problem code represents an optimal control problem comprising a cost function, one or more constraints, and a continuous time model representing dynamics of a system. The method also includes receiving a discretization method preference, a linearization point preference, and a parameter specification, and encoding the optimal control problem into an optimization problem by discretizing the optimal control problem according to the discretization method preference, and linearizing the optimal control problem according to the linearization point preference. The method further includes generating the solver code from the optimization problem, and importing the solver code into a control system of the vehicle for controlling an operation of the vehicle.

In yet another embodiment, a system of automatically generating solver code for a non-linear model predictive control solver includes one or more processors, and one or more memory modules comprising non-transitory memory storing computer readable instructions. The computer readable instructions, when executed by the one or more processors, cause the one or more processors to receive an optimal control problem code, wherein the optimal control problem code represents an optimal control problem comprising a cost function, one or more constraints, and a continuous time model representing dynamics of a system, and receive a discretization method preference, a linearization point preference, and a parameter specification. The computer readable instructions further cause the one or more processors to encode the optimal control problem into an optimization problem by discretizing the optimal control problem according to the discretization method preference, and linearizing the optimal control problem according to the linearization point preference. The computer readable instructions also cause the one or more processors to generate the solver code from the optimization problem.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIGS. 4A and 4B illustrate example optimal control problem code according to one or more embodiments described and illustrated herein;

FIG. 5 illustrates an example solver template that is populated automatically by solver code generation according to one or more embodiments described and illustrated herein;

FIG. 6 illustrates an example automatically generated matrix code according to one or more embodiments described and illustrated herein.

DETAILED DESCRIPTION

The embodiments disclosed herein describe systems and methods for automatically generating solver code for nonlinear model predictive control solvers. More particularly, embodiments provide a programming language that users can use to write simple code expressing the optimal control problem for a nonlinear model predictive controller rather than requiring manual writing of complicated and lengthy solver code that is readable by the nonlinear model predictive controller. In other words, the user writes code that follows the mathematical expression of the optimal control problem rather than the canonical form of the optimization problem.

Embodiments extract the optimal control problem from simple optimal control problem code written by the user and encode it into a canonical form of a linear optimization problem using a user-specified linearization point, a user-specified discretization method, and a user-specified parameter specification. From the optimization problem, a solver code generator creates the solver code by populating a solver template. Thus, the user is not required to generate the thousands of lines of solver code that is executable by the model predictive control solver.

Various embodiments of systems and methods for automatically generating solver code for nonlinear model predictive control solver are described in detail below.

Figure 1:
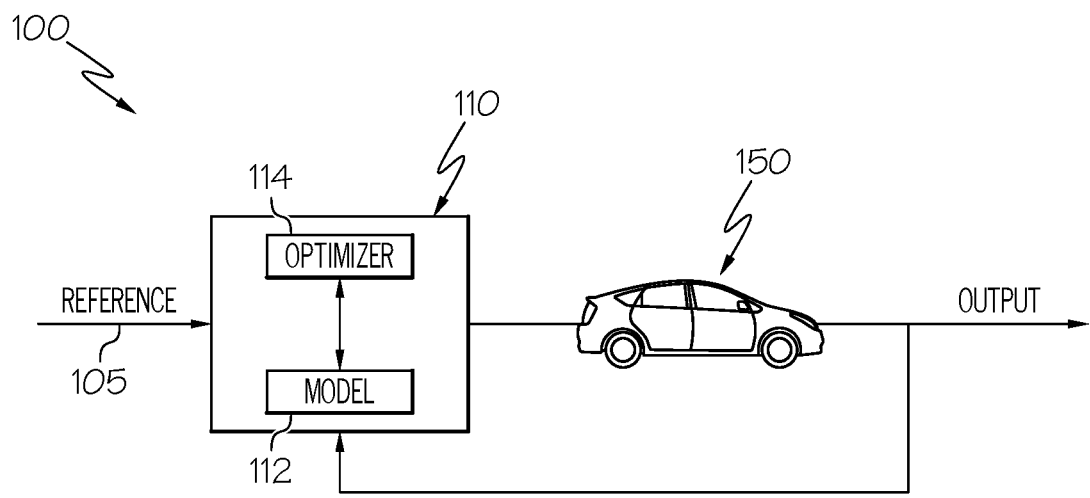
FIG. 1 schematically depicts an example system for controlling a controlled system using a nonlinear model predictive controller according to one or more embodiments disclosed and illustrated herein.

Referring now to FIG. 1, a non-limiting example of a system 100 comprising a non-linear model predictive controller 110 and a controlled system 150 is schematically illustrated. The controlled system 150 is illustrated as a vehicle; however, it should be understood that embodiments are not limited to a vehicles and that the controlled system 150 may be any dynamic system. In embodiments, the nonlinear model predictive controller 110 is non-linear in the sense that it uses a nonlinear system model 112 in the control prediction. In embodiments described herein, the nonlinear model predictive control solver used by the nonlinear model predictive controller 110 may be a convex quadratic programming solver, a sequential quadratic programming solver, or any other known or yet-to-be-developed solver capable of solving nonlinear problems presented by nonlinear model predictive control.

Figure 2:
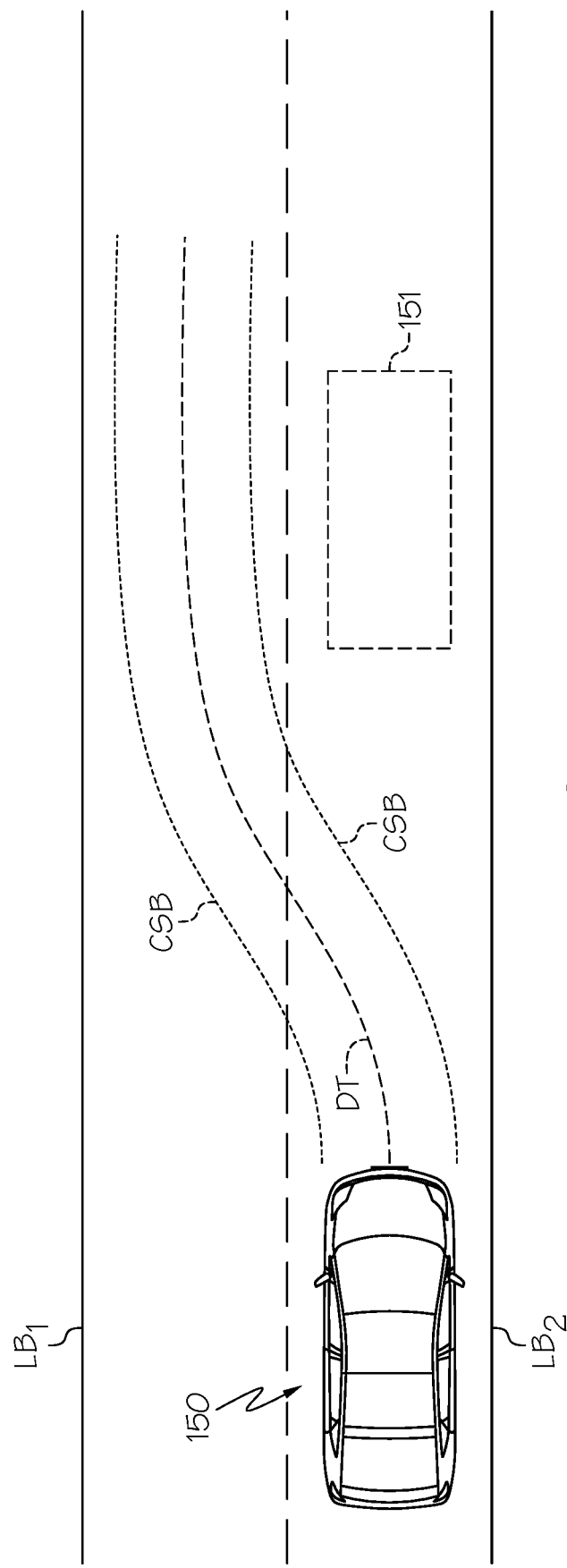
FIG. 2 schematically depicts an example autonomous vehicle navigating a road to avoid an obstacle according to an optimum trajectory according to one or more embodiments described and illustrated herein.

The nonlinear model predictive controller 110 receives a reference input that represents a desired state of the controlled system 150. FIG. 2 illustrates an example vehicle scenario wherein an autonomous vehicle 150 is to take an optimum trajectory OT to avoid an obstacle 151 in the road, which may be, for example, another vehicle driving slowly. The goal of the nonlinear model predictive controller 110 is to maintain the autonomous vehicle 150 as close as possible to the optimum trajectory OT. The optimum trajectory OT is positioned within the convex spatial boundary defining potential solutions, that also includes non-optimum solutions (i.e., non-optimum trajectories).

The nonlinear model predictive controller 110 utilizes an optimizer 114 that includes a cost function used to calculate the difference (i.e., the cost) between the position of the controlled vehicle 150 (or more generically, controlled system) with respect to the optimum trajectory OT (or more generically, a reference function). Embodiments are not limited by any particular cost function. As a non-limiting example, the cost function may be to minimize deviation from a desired velocity or a desired acceleration. In addition, there may be some constraints on the possible behavior of the controlled vehicle 150. For example, in a vehicle application, constraints may be to stay within the lane boundaries (e.g., lane boundaries $LB_1$, $LB_2$ shown in FIG. 2), to drive below an upper speed limit, to drive above a lower speed limit, to accelerate below an acceleration limit, to not jerk quickly to the left and right (i.e., a jerk limit), to stay a minimum distance from other vehicles, and the like.

The problem for the nonlinear model predictive controller 110 to solve may be expressed as an optimal control problem. The dynamics of controlled vehicle may be modeled by a parameterized continuous time model (e.g., model 112 of FIG. 1) that will be automatically discretized and linearized, as described in more detail below:
Dynamics:

$$\dot{v} = a_{cmd} - \beta_1 - \beta_2 v^2 \qquad \text{Eq. (1a)}$$

$$\dot{a}_{cmd} = J \qquad \text{Eq. (1b)}$$

where v, a are the states, J is the control input, $\beta_1$ and $\beta_2$ are parameters.

A non-limiting example cost function for minimizing deviation from a desired velocity and acceleration is provided below:
Cost Function:

$$\min_{[v(k),a(k),J(k) \forall k] in [0,N]} \sum_{k=0}^{N_v} \left[ \psi_v (v(k) - v_{des}(k))^2 + \psi_a (a(k) - a_{des}(k))^2 + \psi_j J(k)^2 \right] \qquad \text{Eq. (2)}$$

where $v_{des}$ is the time-varying desired reference for v, and $a_{des}$ is the time-varying reference for a. The constraints in this example is to obey speed, acceleration, and jerk safety/comfort limits:
Constraints:

$$v_{min}(k) \leq v \leq v_{max}(k) \qquad \text{Eq. (3a)}$$

$$a_{min} \leq a_{cmd} \leq a_{max} \qquad \text{Eq. (3b)}$$

$$J_{min} \leq J \leq J_{max} \qquad \text{Eq. (3c)}$$

where $v_{min}$, $v_{max}$ are the parameters describing the time-varying lower and upper bounds for v, respectively, and similarly for a and J.

It should be understood that any cost function, models, and constraints may be utilized by the systems and methods described herein.

Nonlinear problem solvers, such as a nonlinear model predictive control solver, require the optimal control problem to be transformed into an optimization problem in canonical form. As the optimal control problems described herein are nonlinear, an encoding step is performed to discretize and linearize the optimal control problem. Using another vehicle system example, the vehicle dynamics may be expressed as:

$$\dot{x} = f(x,u) \qquad \text{Eq. (4)}$$

The cost function may be, for example, deviation from an optimum trajectory (e.g., optimum trajectory of FIG. 2), and the constraints may be obstacle positions, actuator limits (e.g., brake pedal, steering wheel, accelerator pedal), and the like. As described in more detail below, the systems and methods of the present disclosure enable a user to select a desired discretization method, a preferred linearization point, and a parameter specification for the encoding step.

The parameter specification allows a user to specify where and what time-varying and/or time-invariant parameters are to be populated in the equations.

The result of the encoding step is an optimization problem. An example optimization problem written in canonical form for the example of the above-paragraph is as follows:

$$\min \sum_{k=0}^{N} \begin{bmatrix} x_k \\ u_k \end{bmatrix}^T H_k \begin{bmatrix} x_k \\ u_k \end{bmatrix} + h_k \begin{bmatrix} x_k \\ u_k \end{bmatrix} \quad \text{Eq. (5)}$$

$$\text{s.t.} \quad x_{k+1} = A_k x_k + B_k u_k + d_k$$

$$F_k x_k + G_k + c_k \leq 0$$

The optimization problem resulting from the encoding process is imported into solver code that is executable by a processor using a solver program. Non-limiting example solver programs include, but are not limited to Forces Pro, OSQP, Interior Point OPTimizer (IPOPT). The solver code, which is a component of the nonlinear model predictive controller 110 shown in FIG. 1, produces outputs that are provided to the controlled system, such as an autonomous vehicle 150. For example, the output of the nonlinear model predictive controller 110 is provided to actuators of the autonomous vehicle 150 such that the autonomous vehicle 150 drives as closely to the optimum trajectory OT as possible. Data provided by vehicle sensors (not shown) such as a speedometer, steering angle sensors, location sensors, camera sensors, and the like are fed back to the nonlinear model predictive controller 110 to calculate the cost with respect to the reference.

Importing the optimization problem into solver code is a manual process performed by software engineers. Solver code representing a complex optimization problem, such as those resulting from a nonlinear optimal control problem for controlling an autonomous vehicle, may have thousands of lines of code. Thus, it is a very time consuming and expensive process to write solver code manually. Additionally, minor changes in existing solver code may be time consuming, and introduce unforeseen errors into the solver code.

Embodiments of the present disclosure simplify the writing of solver code by automating it such that the software engineer writes much fewer lines of code than previously. Particularly, embodiments of the present disclosure provide a programming language that is intuitive and enables a software engineer to write solver code simply by expressing the optimal control program rather than the optimization problem. Embodiments automate both the encoding process as well as the writing of the solver code itself.

Figure 3:
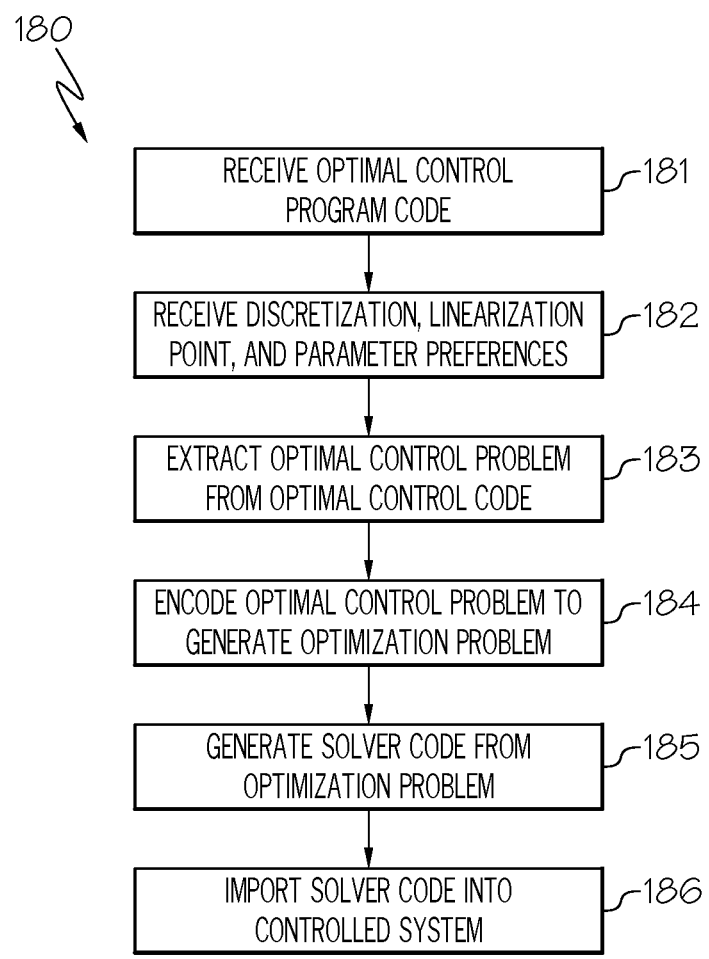
FIG. 3 illustrates an example method for automatically generating solver code for a nonlinear model predictive control solver according to one or more embodiments described and illustrated herein.
Figure 4B:

Referring now to FIG. 3, an example method 180 for automatically generating solver code for a nonlinear model predictive control solver is illustrated. At block 181, a system receives optimal control program code from a user. Referring to FIGS. 4A-4B, sample optimal control problem code 200 corresponding to the optimal control problem defined by Equations (1a)-(3c) above is illustrated. The syntax of the programming language is such that the user need only write code that follows the optimal control program. As shown in FIGS. 4A-4B, the optimal control problem code 200 includes a system dynamics sub-component 202 that describes the dynamics of Equations (1a) and (1b) and creates a linearized and discretized system. The user may easily import the state, input, parameters, and the dynamics of the controlled system. The optimal control problem code 200 may be entered into a computing device, such as a general purpose computer, for example. It is noted that each line of the example optimal control problem code 200 is annotated with a comment that describes its purpose and function.

As stated above, the embodiments of the present disclosure enable the user to provide a parameter specification within the optimal control problem code. The parameter specification allows a user to specify where and what time-varying and time-invariant parameters are to be included in the equations. In the example of FIGS. 4A and 4B, beta_1 and beta_2 in the system dynamics sub-component 202 are specified by the user to be time-invariant parameters. In another example, ref_v_is a time-varying parameter in cost sub-component of the optimal control problem code 200 example. Thus, the user symbolically indicates time-varying or time-invariant parameters in the optimal control problem code 200.

The embodiments of the present disclosure also enable a user to customize the linearization point and the desired discretization method to create the linearized and discretized system. At block 182 of FIG. 3, a preferred discretization method and linearization point is received. In some embodiments, the discretization method and linearization points are provided in the optimal control program code of block 181. In other embodiments, they are selectable features in a user interface, for example.

In the example of FIGS. 4A-4B, the user has set the linearization point to variable v_LP, and can readily change the value of the variable to evaluate different linearization points. Embodiments enable the selection of a desired discretization method from a plurality of discretization methods. In the illustrated example, the user has selected the Euler discretization method with a specified time step. Other discretization methods include, but are not limited to, zero-order hold, trapezoidal, Runge-Kutta, and others. The ability for the user to customize the linearization point and the discretization method allows the user to easily experiment and test different configurations without having to write or rewrite thousands of lines of code.

The sample optimal control problem code 200 further includes a cost function sub-component 204 that describes the cost function of Equation (2) above. The cost function sub-component 204 enables the user to construct the cost function of an optimal control problem. As shown in FIG. 4, the cost function sub-component 204 follows the mathematical expression of the optimal control problem. The programming language allows the user to establish the time-varying parameters of the cost function, which in this case are the velocity and the acceleration. Further, the programming language allows the user to easily construct the cost function using easy to understand syntax.

Additionally, the sample optimal control problem code 200 includes a constraints sub-component 205 that enables a user to establish the constraints of the optimal control problem (e.g., Equations (3a)-(3c) above). Particularly, the constraints sub-component 205 allows the user to establish the time-varying parameters, and also allows the user to set the limits on the various constraints. In the example of FIG. 4, the time-varying parameters are established as v_min and v_max, and the limits of the constraints for velocity v (velocity limit), acceleration a and jerk J are established as defined by Equations (2a)-(2c) above.

Referring once again FIG. 3, at block 183 a solver code generator extracts the optimal control problem from the optical control problem code. For example, all parameters, variables, the cost function, the dynamics, the constrains, the linearization point, and the discretization method is extracted. This extracted information is then used to define the data required by the canonical mathematical program, e.g., the matrices H, h, A, B, F, G, c in equation (5) are encoded by the code generator for the user. In addition, several traits of the program are determined, such as the sparsity pattern (e.g. diagonal matrices or time invariance). The solver code may be customized to efficiently compute the program based on one or more sparsity patterns. As a non-limiting example, common sub-expression elimination may also be used to customize solver code for efficient computation. As a non-limiting example, the solver code generator may extract the optimal control problem defined by Equations (1)-(3c) above from the optimal control problem code 200 illustrated by FIG. 4.

At block 184, the solver code generator is programmed to generate an optimization problem from the optimal control problem that is extracted from the optimal control problem code by an encoding process that uses the selected linearization point and discretization method. As a non-limiting example, the solver code generator may generate the optimization problem of Equation (5) that corresponds to the optimal control problem of Equations (1)-(3c) above.

After generating the optimization problem, it is used to automatically generate solver code at block 185. The information of the optimization problem that was extracted from the user-inputted optimal control program code is populated into a solver template that is used to generate the solver code. A non-limiting example solver template 220 is illustrated by FIG. 5. The example solver template 220 has a solver customization sub-component 222 that enables customizations such as whether the cost matrices exhibit a diagonal sparsity pattern, whether the dynamics are time invariant, and whether the solver should use dynamic memory allocation. A solver input sub-component 224 of the solver template 220 automatically generates the solver inputs from the optimization problem. As shown in FIG. 5, the solver input sub-component 224 includes matrix generation functions that calculate the matrices using the parameters of the optimization problem. The matrices are calculated by examining the equations describing the cost, constraints, and dynamics, and rearranging these into matrices of the canonical mathematical program. An example automatically generated matrix code 230 using the solver code generator is depicted by FIG. 6. It should be understood that embodiments free the software engineering from needing to manually write code such as the code of FIG. 6 representing a matrices.

With the solver code automatically generated at block 185, it is then imported into a controlled system 150 (e.g., an autonomous vehicle) for execution at block 186.

Figure 7:
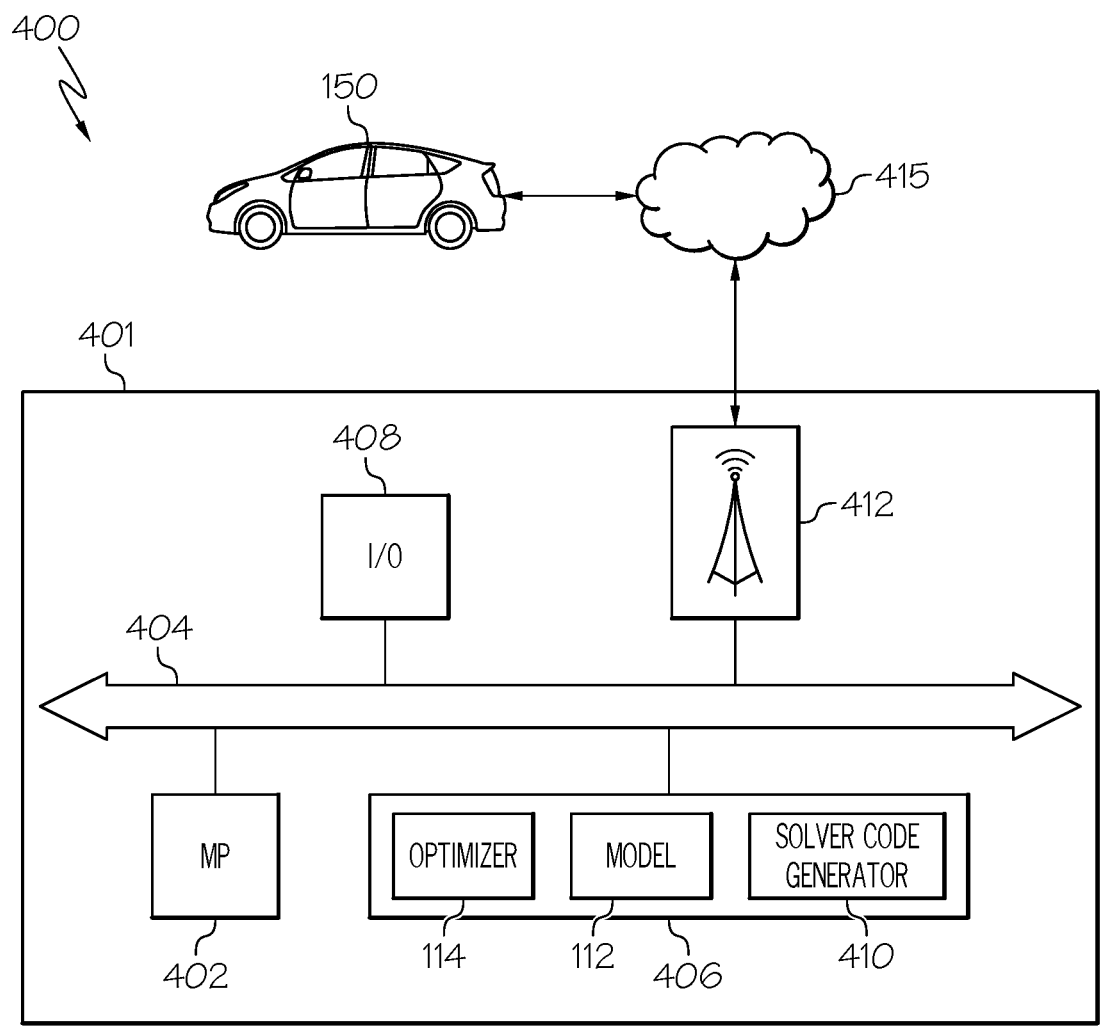
FIG. 7 schematically illustrates an example system for automatically generating solver code and deploying the solver code to a controlled system according to one or more embodiments described and illustrated herein.

FIG. 7 depicts an example system 400 for performing the functionalities as described herein. In some embodiments, the system 400 may include a computing device 401, such as a general purpose computer, and a controlled system, such as the vehicle 150 illustrated in FIG. 7. The example computing device 401 of the system 400 includes one or more processors 402, a communication path 404, one or more memory modules 406, input/output devices 408, and network interface hardware 412, the details of which will be set forth in the following paragraphs. It should be understood that the system 400 of FIG. 7 is provided for illustrative purposes only, and that other systems 400 comprising more, fewer, or different components may be utilized.

Each of the one or more processors 402 may be any device capable of executing computer readable and executable instructions. Accordingly, each of the one or more processors 402 may be a controller, an integrated circuit, a microchip, a computer, or any other computing device. The one or more processors 402 are coupled to a communication path 404 that provides signal interconnectivity between various modules of the system 400. Accordingly, the communication path 404 may communicatively couple any number of processors 402 with one another, and allow the modules coupled to the communication path 404 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 404 may be formed from any medium that is capable of transmitting a signal such as, for example, conductive wires, conductive traces, optical waveguides, or the like. In some embodiments, the communication path 404 may facilitate the transmission of wireless signals, such as WiFi, Bluetooth®, Near Field Communication (NFC) and the like. Moreover, the communication path 404 may be formed from a combination of mediums capable of transmitting signals. In one embodiment, the communication path 404 comprises a combination of conductive traces, conductive wires, connectors, and buses that cooperate to permit the transmission of electrical data signals to components such as processors, memories, sensors, input devices, output devices, and communication devices. Accordingly, the communication path 404 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The system 400 includes one or more memory modules 406 coupled to the communication path 404. The one or more memory modules 406 may comprise RAM, ROM, flash memories, hard drives, or any device capable of storing computer readable and executable instructions such that the computer readable and executable instructions can be accessed by the one or more processors 402. The computer readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into computer readable and executable instructions and stored on the one or more memory modules 406. Alternatively, the computer readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 406 include logic in the form of computer readable instructions that perform the functionalities described herein, such as optimizer logic 114 and solver code generator logic 410. The one or more memory modules 406 may further store the model 112 of the controlled system as described above. Additional data used to support these functionalities may be stored in the one or more memory modules 406 and/or in remote memory modules.

Still referring to FIG. 7, the system 400 may comprise network interface hardware 412 for communicatively coupling the system 400 to a remote computing device (not shown). The network interface hardware 412 can be communicatively coupled to the communication path 404 and can be any device capable of transmitting and/or receiving data via a network 415. Accordingly, the network interface hardware 412 can include a communication transceiver for sending and/or receiving any wired or wireless communication. For example, the network interface hardware 412 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 412 includes hardware configured to operate in accordance with the Bluetooth® wireless communication protocol. In some embodiments, the network interface hardware 412 and the network 415 may be utilized to deploy updated solver code to vehicles 150 by way of an over-the-air update process.

It should now be understood that embodiments of the present disclosure are directed to systems and methods for automatically generating solver code for a nonlinear model predictive control solver. Embodiments provide an easy-to-use programming language that enables a user to write simple code (optimal control problem code) that represents an optimal control problem that reflects the mathematical expression of the optimal control problem. Embodiments also enable a user to customize the linearization point and the chosen discretization method to linearize the nonlinear optimal control problem. This powerful feature lets a user quickly change the linearization point and discretization method without needing to update many lines of complicated solver code. Further, embodiments automatically encode the optimal control problem represented by the optimal control problem code into a canonically expressed optimization problem. From the optimization problem, a solver code template is populated to automatically generate solver code that may be executed by a nonlinear model predictive control solver and ultimately used to control a controlled system. Accordingly, software engineers are saved from writing complicated solver code comprising thousands of lines.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of automatically generating solver code for a nonlinear model predictive control solver, the method comprising:
   receiving an optimal control problem code, wherein the optimal control problem code represents an optimal control problem comprising a cost function, one or more constraints, and a continuous time model representing dynamics of a system;
   receiving, from a user interface, a selection of a discretization method preference, a linearization point preference value, and a parameter specification;
   encoding the optimal control problem into an optimization problem by performing at least the following:
      discretizing the optimal control problem according to the discretization method preference; and
      linearizing the optimal control problem according to the linearization point preference value; and
   generating the solver code from the optimization problem; and
   inputting the solver code into a controlled system to control the controlled system.

2. The method of claim 1, wherein the optimal control problem code represents a canonical form of the optimal control problem.

3. The method of claim 1, wherein the optimal control problem code represents the optimal control problem using a syntax.

4. The method of claim 1, wherein generating the solver code comprises populating a solver code template with parameters from the optimization problem.

5. The method of claim 4, wherein generating the solver code comprises generating matrix inputs as a function of parameters from the optimization problem.

6. The method of claim 1, wherein the discretization method preference is selected from the group consisting of Euler, zero-order hold, trapezoidal, and Runge-Kutta.

7. The method of claim 1, wherein the dynamics of the system describe vehicular dynamics of a vehicle, the cost function describes a deviation from an optimum trajectory, and the one or more constraints comprises one or more of an upper speed limit, an acceleration limit, a position to avoid an obstacle, and a jerk limit.

8. A method of controlling a vehicle, the method comprising:
   receiving an optimal control problem code, wherein the optimal control problem code represents an optimal control problem comprising a cost function, one or more constraints, and a continuous time model representing dynamics of a system;
   receiving, from a user interface, a selection of a discretization method preference, a linearization point preference value, and a parameter specification;
   encoding the optimal control problem into an optimization problem by performing at least the following:
      discretizing the optimal control problem according to the discretization method preference; and
      linearizing the optimal control problem according to the linearization point preference value; and
   generating the solver code from the optimization problem;
   importing the solver code into a control system of the vehicle for controlling an operation of the vehicle.

9. The method of claim 8, wherein the optimal control problem code represents a canonical form of the optimal control problem.

10. The method of claim 8, wherein the optimal control problem code represents the optimal control problem using a syntax.

11. The method of claim 8, wherein generating the solver code comprises populating a solver code template with parameters from the optimization problem.

12. The method of claim 11, wherein generating the solver code comprises generating matrix inputs as a function of parameters from the optimization problem.

13. The method of claim 8, wherein the discretization method preference is selected from the group consisting of Euler, zero-order hold, trapezoidal, and Runge-Kutta.

14. The method of claim 8, wherein the dynamics of the system describe vehicular dynamics of the vehicle, the cost function describes a deviation from an optimum trajectory, and the one or more constraints comprises one or more of an upper speed limit, an acceleration limit, a position to avoid an obstacle, and a jerk limit.

15. A system of automatically generating solver code for a non-linear model predictive control solver, the system comprising:
    one or more processors;
    one or more memory modules comprising non-transitory memory storing computer readable instructions that, when executed by the one or more processors, cause the one or more processors to perform at least the following:
        receive an optimal control problem code, wherein the optimal control problem code represents an optimal control problem comprising a cost function, one or more constraints, and a continuous time model representing dynamics of a system;
        receive, from a user interface, a selection of a discretization method preference, a linearization point preference value, and a parameter specification;
        encode the optimal control problem into an optimization problem by performing at least the following:
            discretizing the optimal control problem according to the discretization method preference; and
            linearizing the optimal control problem according to the linearization point preference value; and
        generate the solver code from the optimization problem; and
        input the solver code into a controlled system to control the controlled system.

16. The system of claim 15, wherein the optimal control problem code represents a canonical form of the optimal control problem.

17. The system of claim 15, wherein the optimal control problem code represents the optimal control problem using a syntax.

18. The system of claim 15, wherein generation of the solver code comprises populating a solver code template with parameters from the optimization problem.

19. The system of claim 18, wherein generation of the solver code comprises generating matrix inputs as a function of parameters from the optimization problem.

20. The system of claim 15, wherein the discretization preference is selected from the group consisting of Euler, zero-order hold, trapezoidal, and Runge-Kutta.

* * * * *